March 15, 1938.   L. H. COLBERT   2,110,906
ALTERNATING CURRENT-DIRECT CURRENT DYNAMIC BRAKING SYSTEM FOR HOIST MOTORS
Filed Oct. 19, 1936   6 Sheets-Sheet 1

INVENTOR.
LESTER H. COLBERT.
BY
ATTORNEY.

March 15, 1938.  L. H. COLBERT  2,110,906

ALTERNATING CURRENT-DIRECT CURRENT DYNAMIC BRAKING SYSTEM FOR HOIST MOTORS

Filed Oct. 19, 1936  6 Sheets-Sheet 4

INVENTOR.
LESTER H. COLBERT.
BY Slaugh and Canfield
ATTORNEY.

March 15, 1938. L. H. COLBERT 2,110,906
ALTERNATING CURRENT-DIRECT CURRENT DYNAMIC BRAKING SYSTEM FOR HOIST MOTORS
Filed Oct. 19, 1936 6 Sheets-Sheet 5

FIG. 6.

INVENTOR.
LESTER H. COLBERT.
BY
ATTORNEY.

FIG 9.

Patented Mar. 15, 1938

2,110,906

UNITED STATES PATENT OFFICE 2,110,906

ALTERNATING CURRENT—DIRECT CURRENT DYNAMIC BRAKING SYSTEM FOR HOIST MOTORS

Lester H. Colbert, Cleveland Heights, Ohio, assignor to The Clark Controller Company, Cleveland, Ohio, a corporation of Ohio Application October 19, 1936, Serial No. 106,269

18 Claims. (Cl. 172—179)

This invention relates to electric systems of control for alternating current induction motors which are utilized as the driving motors for apparatus in which the load at times overhauls the motor and drives it, and in which the overhauling load must be braked to stop its movement and bring it to rest. The invention is particularly applicable to hoist motors which, in the operation of the hoist may be overhauled and driven by a descending load, and the invention will be described herein as applied to that use.

Heretofore it has been proposed to operate an electric hoist by an alternating current slip-ring induction motor and to brake the descending overhauling load on the motor by applying direct current to the stator of the motor, and controlling the alternating dynamic braking current thereby generated in the rotor, by external resistances in the rotor circuits.

Heretofore, however, such control systems have not been successful for a number of reasons, particularly in the field of general crane hoist service, in which the hoist load must be rapidly raised and rapidly lowered and accurately stopped in its descent to position the load.

It is, of course desirable, in a direct current dynamic braking controller of this class, that the resistance in the rotor circuit be variable to vary the resistance in the rotor circuit be variable to vary the descending overhauling dynamically braked speed. The resistance must be increased to reduce the braking effect to increase the speed, and vice versa.

Now it is a fact that in such cases the resistance in the rotor circuit may be increased at will either slowly, as by steps, or all in one step to correspondingly increase the lowering speed; but that when the braking speed is to be correspondingly decreased the resistance must be reduced relatively slowly, for if the resistance be reduced too quickly the descending load torque will overcome the braking torque and the load will run away with the motor. I have found that this is due to certain torque-speed-rotor resistance characteristics of the slip-ring induction motor to be more fully described hereinafter.

Such controllers therefore are not only unsafe to place in the hands of the usual operator because of the extreme care by which the resistance must be cut out to slow down the load, but are, in fact, impracticable for most hoist uses, because it is generally desirable to lower the load very rapidly through the major part of the descent and to bring it quickly to rest at the bottom of the descent, and this cannot be accomplished in the systems heretofore proposed with which I am acquainted, because of the said inherent speed-torque-resistance characteristics of induction motors.

It is therefore an object of this invention to provide an improved control system for a slip-ring induction hoist motor by which hoisting and lowering may be performed at a selection of speeds including high speeds, and braking of the descent may be performed wholly electrically at all lowering speeds including the highest speed.

Other objects are:

To provide for hoist induction motors having a load holding friction brake, an improved dynamic braking controller in which automatic means is provided to insure a predeteremined reduction in the lowering dynamic braking speed of the motor before applying the holding brake.

To provide for alternating current hoist induction motors an improved control system for effecting electric braking of the motor at very low and very high and intermediate lowering speeds.

To provide for alternating current hoist induction motors an improved control system by which the hoist load may be lowered at high speed and quickly braked electrically to bring it substantially to rest.

To provide for alternating current hoist induction motors an improved control system by which the hoist load may be lowered at very high speed, quickly braked electrically to bring it substantially to rest, and then slowly hoisted or slowly lowered to accurately position the load.

To provide for alternating current hoist induction motors of the type provided with a load holding brake, an improved control system operated by manual means, by which a load may be lowered at high speed and quickly slowed down by electric braking, and the holding brake automatically applied after the manual means is set for stopping.

Other objects will be apparent to those skilled in the art to which my invention appertains.

In general, my invention comprises an electric controller under manual control of an operator by which sections of resistance may be successively inserted in the circuit of the motor armature to cause the descending overhauling load on the motor to be dynamically braked at successively higher lowering speeds. If a certain lowering speed is not exceeded by this means, then when it is desired to reduce the lowering speed, the same resistances, by the same steps, may be cut out of the rotor circuit. Thus within said speed limits for a given load up to and including full load, the controller may be operated at will to increase or decrease the dynamically braked lowering speed. If however, the controller be operated to effect a lowering speed beyond the said predetermined speed, then if the controller be moved to reduce the lowering speed, automatic means comes into action which maintains the armature resistance at such value or values that the load torque cannot overcome the rotor dynamic braking torque and the load cannot run away with the motor.

In the following, three species embodiments of this fundamental principle are illustrated and described in connection with diagrammatic showings of the respective electric control and power circuits.

In the first described embodiment of the invention, the motor field is first energized with direct current, and a limited number of steps of resistance and corresponding speeds of dynamically braked lowering are provided and the controller operator may, at will, cut these resistances into and out of the rotor circuit, the maximum attainable lowering speed being such that the load cannot run away with the motor; and for higher speeds such for example as full synchronous speed or higher, the motor is driven downwardy by power as an alternating current motor until dynamic braking begins, that is to say, alternating current is applied to the stator of the motor and the rotor is short circuited or substantially so and after the speed reaches synchronous speed, the load overhauls the rotor and is dynamically braked by the generation of alternating current therein. At the bottom of the descent, to bring the load quickly to rest, the stator is again energized with direct current and a preselected section of resistance is inserted in the rotor circuit of such value that even at speeds of 115% synchronous speed, and at full load, the dynamic braking torque will exceed the load torque and will bring the descending load quickly down to a low speed at which an electrically operated friction brake may stop it and hold it. The section of resistance is automatically or extra-manually inserted in the rotor circuit, upon operating the controller to slow the descent, entirely out of control of the operator.

In the second form of the invention to be described, resistance steps are provided which may be cut into or cut out of the rotor circuit at the will of the operator to provide dynamic braking speeds up to a certain intermediate speed; and other steps of resistance are provided which, when inserted in the rotor circuit, will raise the lowering speed higher and higher to, say, 200% of synchronous speed; and at all speeds above the said intermediate speed, if the operator of the controller operates it to reduce the brake lowering speed, automatic extra-manual means comes into action to delay the change from one speed step to another so that it becomes impossible for the operator to cut the resistances out of the rotor circuit faster than at a pre-determined rate at which the braking torque is maintained greater than the load torque. The speed is thus reduced to or below the said intermediate speed at which the operator is again given optional manual control of the resistance steps, and the slowed descent may be stopped by a friction brake as in the other form. In this form all dynamic braking is done with a direct current energized motor field.

In the third to be described embodiment, resistance sections may be inserted into the rotor circuit, one after another to increase the dynamically braked descent of the load to higher and higher speeds up to, say 115% of synchronous motor speed. Also up to a predetermined intermediate speed, the resistance may be cut out of the rotor circuit at will to reduce the lowering speed, but above this intermediate speed, the load will run away with the motor if the resistance is cut out of the rotor circuit too rapidly. Automatic or extra-manual means is provided which comes into operation when the controller operator attempts to cut out rotor resistance at speeds above the said intermediate speed, and inserts in the rotor circuit a pre-selected amount of resistance with which, even at speeds as high as 115% synchronous speed, will effect a dynamic braking torque greater than the developed load torque and slow the load down to a slow speed, at which an electrically operated friction brake will stop and hold it. In this form all dynamic braking is done with a direct current energized motor field.

My invention is fully disclosed in the following description taken in connection with the accompanying drawings, in which.

As is well-known, alternating current electric motors of the induction type comprising a wound stator and a wound slip-ring rotor may be used to drive the drum of a hoist or other mechanism of which the load may be capable of overhauling and driving the rotor. It is also known that if the stator of the motor be energized with direct current, an overhauling load driving the rotor will generate therein alternating current and the absorption of power by the generation of current will effect a so-called dynamic braking action retarding the descent of the load, the braking action being commensurate with the amount of current generated. With low resistance in the slip-ring rotor circuit, a large current will be generated and produce great braking action and vice versa so that the braking action may be controlled by varying the resistance of the rotor circuit.

I have found, by extensive experiments, that the dynamic braking action for any given resistance is also commensurable with the speed of rotation of the rotor and therefore the speed of the descending load.

I have referred here to the conventional induction motor in which the stator is the field and the rotor is the armature. The same effects result, whichever of the two, the field or the armature, is the rotor.

Figure 1:
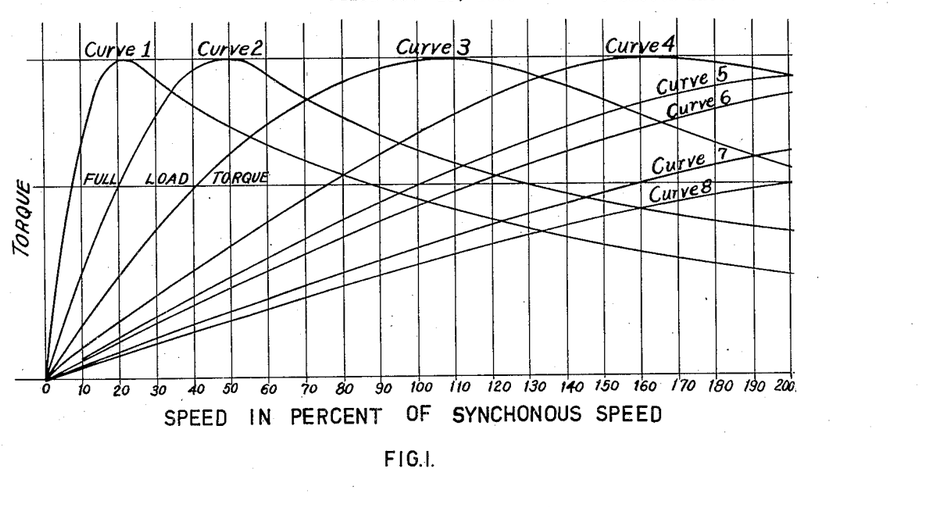
Fig. 1 is a graph illustrating certain torque-speed-resistance characteristics of an induction motor utilized in the practice of my invention.

I have illustrated these relations in Fig. 1 wherein ordinates represent dynamic braking motor torque and abscissae represent fractional percentages of synchronous rotor speed. The horizontal line designated "full-load torque" represents a value of braking torque equivalent to the full-rated load torque of the motor when driving a load.

"Curve 1", "curve 2", etc., represent the braking torque at different speeds for respectively different resistances in the rotor circuit.

For a relatively low resistance, curve 1 shows that, at speeds above 20% of synchronism, the braking torque dies off rapidly. For a greater resistance, as for curve 2, the maximum braking torque occurs at about 50% of synchronous speed and thereafter does not die off so rapidly. For still more resistance, curve 3, shows that there is a constantly increasing braking torque up to full synchronous speed. For still more resistance curves 4 to 8 show maximum braking torque at higher and higher speeds, the braking torque at the lower speeds being very low.

It is this characteristic of the motor when utilized for dynamic braking that creates a problem which, so far as I am aware has not heretofore been solved. The problem will be apparent from the following brief discussion.

Suppose that the load to be lowered is equivalent to the "full load" of the motor and that a value of resistance is put in the rotor circuit corresponding to curve 1, and that the holding brake (usually some kind of friction brake) is released. The load will start to descend but by the time it has attained approximately 8% of synchronous speed, the braking torque will have risen until it is equal to the full-load torque and the two will balance and the load will stop increasing in speed. If then, the resistance be changed to correspond to curve 2, the load will increase in speed to approximately 20% of synchronism and again the braking torque will balance the load and the speed will remain constant. Similarly, the resistance may be changed to correspond successively to curves 3, 4, 5, 6, 7 and 8 at which the speed may rise respectively to 40%, 75%, 100% to 115%, 160% and 200% of synchronism.

Thus, to increase the lowering speed, no difficulty is encountered. As the resistance is increased, step by step, the load comes up to a corresponding speed and remains at that speed. If now the operator of the controller wishes to reduce the lowering speed, by cutting out resistance, step by step, he may do so without danger if he changes the resistance slowly because as he goes back from one curve to the next the braking torque for the next curve is greater than the load torque. Also if the speed is not greater than 75% synchronous, curve 4, the operator may go back instantly to the lowest speed, curve 1, because the braking torque for curve 1 is, at all times, greater than the load torque, and the load will slow down to the 8% of synchronism determined by the curve 1.

But supposing that it be desired for the load to descend at greater than 75% synchronous speed, the operator will cut out resistance to give curve 5. On this curve, the braking torque balances the load torque at 100% synchronism. If the load is descending at this speed, and the operator moves his controller to cut out an amount of resistance which changes say, from curve 5 to curve 1, the braking torque at 100% synchronism becomes at once that of curve 1 which is less than full-load torque so that the braking torque is not enough to hold the load and the load will run away with the motor.

Thus, in a dynamic braking system of this type, if the controller is arranged to have one or more steps of resistance to give one or more steps of very low braking speeds, then there is an upper limit of braking speed beyond which it is not safe to go because of the liability that the operator will cut the resistance out too rapidly and cause the load to run away. In this connection, it will be observed that if the operator goes from curve 5 to curve 4, and stops there, the motor will be slowed down to approximately 75% synchronism; and then if he goes to curve 3, the motor will slow down to approximately 40% synchronism, which brings the torque under curve 1 so that there is then no longer any danger of running away. But the average operator cannot be relied upon to slow the load down by this slow mode of operation and therefore if he is given a speed higher than 75% synchronism and a low speed, he is apt to move the controller to the low speed too rapidly and cause the load to run away. Also in practise it is often desirable to lower the load at very high speed over the major portion of the descent and then to bring it quickly to rest on a low speed.

According to my invention therefore, although lowering speeds are provided greater than 75% synchronous speed, when it is desired to go back from such higher speeds to lower speeds, the cutting out of the resistance is automatically taken out of the control of the operator so that running away of the load is prevented, not withstanding that speeds as high as 200% of synchronism may be had.

*First form*

The first embodiment of my invention by which this result is accomplished will now be described, in connection with Figs. 2, 3 and 4.

At 1 is illustrated conventionally, an induction motor having a three phase stator winding energized by supply mains 2, 3 and 4 from a suitable source of alternating current through the contacts of switches 5 and 6 in the lines 2 and 4 respectively and switches 7 and 8 in the line 3.

The rotor 3 of the motor is provided with external resistances in each phase thereof, 9 to 13 each triple group of resistances arranged to be short-circuited by corresponding pairs of switches 14—14 to 18—18 inclusive.

The motor 1 is provided with a friction brake indicated generally at 19 having a winding 20 by which the brake may be released, the brake being of a well known type which sets when the winding 20 is de-energized. The winding 20 is connected, through a pair of switches 21 and 22 to the supply mains 23 and 24 of a motor generator shown generally at 25. The mains 23 and 24, being direct current mains, supply current through a pair of switches 26 and 27 to the stator winding of the motor 1 when the switches 26 and 27 are closed. The motor 1 may be reversely driven, in one direction when the switches 5, 6, 7 and 8 are closed and in the other direction when the switches 5, 8 and reversing switches 29 and 28 are closed, these reversing connections being well known.

At 66 is the electro-magnetic winding of a low voltage relay controlling switches 67 and 68 in a manner to be described which will cause these switches to open upon failure of the direct current voltage, and set the brake 19 as a protective feature.

Figure 2:
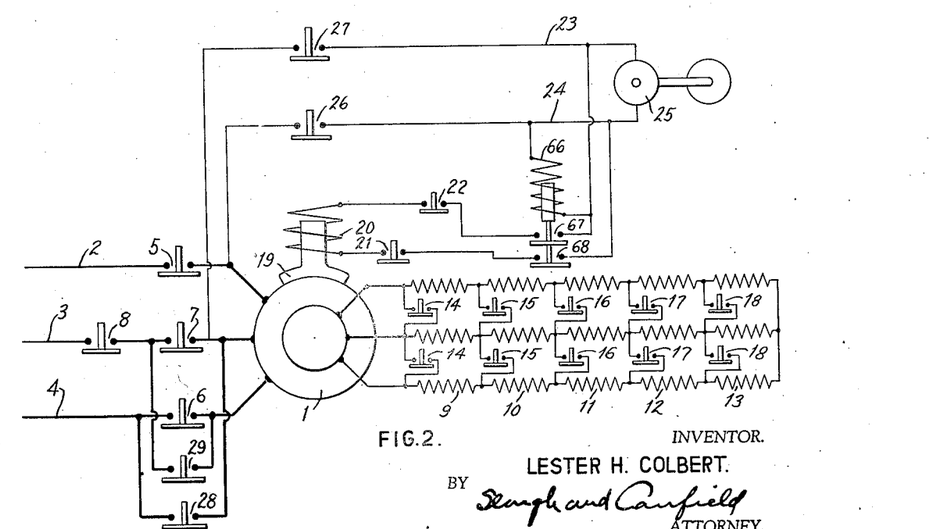
Figs. 2 and 3 are respectively power circuit and control circuit diagrams of a dynamic braking motor control system embodying one form of my invention.

The various switches illustrated in Fig. 2 are electromagnetic, the windings thereof and the control circuits for suitably energizing the windings being omitted to simplify the showing, these parts being illustrated and to be described in connection with Figs. 3 and 4. The operation of the embodiment illustrated in Fig. 2 is as follows.

The motor 1 is connected to the hoist drum of a general service hoist, that is to say, a hoist which may be used to raise and to lower loads of different weights and through different distances. To raise a load, the switches 14 to 18 inclusive are all open, inserting all of the resistance in the motor rotor circuit. When switches 21 and 22 are closed, the motor generator 25 energizes the brake winding 20 to release the brake 19. To start the motor in the hoisting direction, the switches 5, 6, 7 and 8 are closed. To increase or decrease the speed of hoisting, as may be desired, the switches 18 to 14 respectively are operated in pairs controlling the triple resistance sections 13 to 9 selectively, to cause more or less current to be generated in the motor rotor and vary the torque and speed thereof.

It will therefore be seen that the hoisting functions and the mode of operation are those commonly employed and that they constitute no essential part of the present invention.

To lower a hoisted load, the switches 5, 6, 7 and 8 are all opened and the switches 26 and 27 are closed thus supplying the motor stator with direct current and the switches 14 to 18 are closed. The switches 21 and 22 are now closed to release the brake 19, and the load overhauls the rotor, driving it and generating alternating current therein which is of high value because of the low rotor resistance and the load slowly descends, being dynamically braked by the generation of the current. To increase the speed of lowering by steps, the switches 14 to 16 are opened introducing into the rotor circuit the resistances 9 to 11 and reducing the dynamic braking effect. If it be desired to decrease the lowering speed, the switches 16 to 14 may be successively closed, one or all, corresponding to the speed desired.

The braking effect for each of the switches 14 to 16 is represented by the curves, curve 1 to curve 4 of Fig. 1. And as above described, for the speeds which may be attained by these resistance steps, the maximum speed being approximately 75% of synchronous speed for curve 4, the operator may vary the speeds up or down at will, rapidly or slowly.

When a still higher lowering speed is desired, the following operation is effected. The switches 14 are closed, short circuiting the motor rotor. The switches 5, 6, 29 and 28 are closed to apply alternating current directly to the stator in the reverse or lowering direction, and the switches 26 and 27 are opened to discontinue the direct current energization of the stator. The motor is thus operated as an induction motor driving the load downwardly by power. The rotor will quickly come up to synchronous speed and because of the load will be overhauled to a greater speed. If the load is, for example, full load, the speed may come up to 105% or 110% of synchronous speed.

It is to be observed that under these conditions after the motor has been driven in the lowering direction up to synchronous speed, the descent will be actually braked dynamically, because, even for light loads, the load will rotate the rotor faster than synchronous speed and any increase of speed above synchronous speed will generate current in the rotor, the faster the speed the more current. It thus is clear that applying downward driving power to the motor merely functions to quickly bring the rotor speed up to synchronism after which the load is braked dynamically by overhauling the rotor.

These high speeds will in practice be commonly employed to quickly lower a load through the major part of its descent and at the bottom of the descent it will be desired to quickly bring the speed down to a low value.

This is done by opening the switches 5, 6, 29 and 28 to disconnect the motor stator from the alternating current supply and closing the switches 26 and 27 to energize it with direct current and by effecting a suitable braking action by a suitable value of resistance in the rotor circuit. But this can not be with the resistance steps 9 to 11, above described, if left within the control of the hoist operator, because he might close switches 14—14, and this, as will be apparent from curve 1 Fig. 1 in connection with the above discussion thereof, will produce a dynamic braking torque which at the speed of 110% to 115% synchronous speed will, be less than the load torque, if full load, and the load will run away with the motor. Therefore to stop the load, extra-manual means is provided to predetermine the rotor resistance at a certain value in every case for example, that of the resistances 9. This, as shown by curve 2 Fig. 1, develops a dynamic braking torque at speeds 110% to 115% synchronism greater than full load lowering torque. This will bring the load quickly down to, say 20% of synchronous speed as shown in Fig. 1 and then the friction brake 19 is set by the opening of the switches 21 and 22.

To insure that the load will slow down to such speed before the brake 19 is applied, the entire action is made automatic, that is to say, when the hoist operator operates the controller in a manner to be described to change from alternating current power driven descent or alternating current braking, to direct current braking, the alternating current power is interrupted and the direct current applied and the said rotor resistance value is established. If a complete stop is wanted, the friction brake sets immediately but the direct current is maintained to help the friction brake in bringing the load to rest and this direct current is automatically disconnected after a time interval of, approximately two seconds.

To sum up this mode of operation, it may be said that for lowering speeds up to say, 75% of synchronous speed, dynamic braking is effected by direct current energization of the motor stator, and resistances are cut out of the rotor circuit or cut into the same at the pleasure of the operator to vary the speed of lowering; and for higher speeds, the motor is driven downwardly by alternating current power on the stator to bring it quickly up to synchronous speed, and the load then overhauls the rotor to effect descent at higher than synchronous speed, being braked dynamically thereby; and at the end of the descent to slow down the lowering speed, the direct current is again applied to the stator and a selected or critical amount of resistance is inserted in the rotor circuit, such value of resistance being predetermined to provide at the greater than synchronous speed, a dynamic braking torque always greater than full load lowering torque, and this reduces the speed to a relatively low value at which the load may be finally stopped and held by a friction brake; and thereafter the operator may again control the lowering speed by manipulation of the resistance sections in the rotor circuit at various speeds up to but not beyond the chosen 75% of synchronous speed value. Hoisting may be accomplished in the well known manner at various speeds by rotor resistance control.

As above stated, these operations are effected by electro-magnetic switches, illustrated in simplified form in Fig. 2 and the control circuits and contactors, etc., by which these switches may be operated under the control of a hoist operator will now be described in connection with Figs. 3 and 4.

Figure 3:
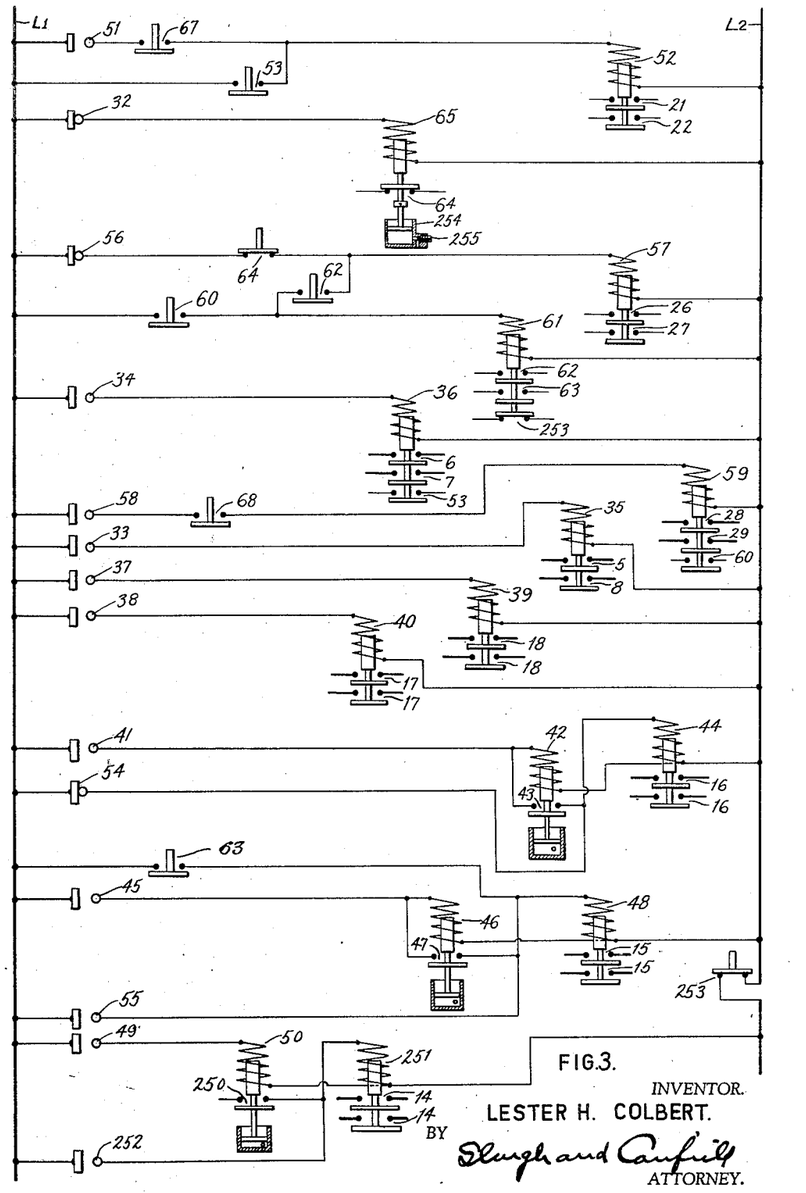
Figure 4:
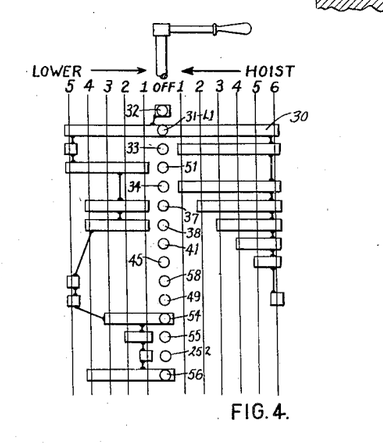
Fig. 4 is a diagrammatically represented master drum controller for the control system of Fig. 3.

The various switches of Fig. 2 illustrated therein in simplified form are illustrated diagrammatically with their windings in Fig. 3 and in that figure are illustrated various drum contacts which may be opened or closed by the operation of a master drum illustrated in Fig. 4. It is by means of this drum that the operator of the hoist effects the operation thereof.

The drum of Fig. 4 is illustrated in conventional diagrammatic form comprising sector form contacts, such as that indicated at 30 of various lengths, which may be rotated into and out of engagement with a row of stationary contacts such as that at 31. The rotary drum has an off position from which it may be rotated in opposite directions to effect the hoisting and lowering operations above described as indicated in Fig. 4 by the legends "Off", "Hoist" and "Lower".

The movable drum contacts are all electrically connected together. The control current may be supplied from any suitable source and as indicated in Fig. 3 by the mains L—1 and L—2. The line L—1 is connected to the contact 31, Fig. 4, and thus to the other drum contacts and as the drum is moved in one direction or the other, the several stationary contacts are connected selectively to the line L—1 and this is illustrated diagrammatically in Fig. 3 by reference characters indicating the stationary contacts only.

To operate the motor to hoist, the drum is moved to the first hoist position, Fig. 4. This connects contacts 33 and 34 to the line L—1. Current flows from the line L—1 through contact 33, thence through the winding 35 closing two switches 5 and 8. Current flows by way of the contact 34 through the winding 36 closing two switches 6 and 7. These are the switches 5, 8, 6 and 7 of Fig. 2 and current is thereby supplied to the stator of the motor as above described. The winding 36 also closes a switch 53 which, as reproduced in the upper part of Fig. 3, energizes a winding 52 which closes switches 21 and 22 to release the brake 19 as shown in Fig. 2.

At this time, the resistance switches 14 to 18 are all open and the motor hoists at low speed. Upon moving the drum successively to energize contacts 37 and 38 on hoist positions 2 and 3, current flows respectively through windings 39 and 40 of electro-magnetic switches 18—18 and 17—17 which, respectively, cut out of the circuit, (see Fig. 2) the resistance sections 13—13 and 12—12.

On the fourth hoist position, current flows from the contact 41 through the winding 42 of a delayed operation electro-magnetic switch 43 which, when it closes, effects energization of a winding 44 of switches 16—16 which close and cut out of the rotor circuit resistance 11.

On the fifth hoist step, current flows from the contact 45 through the winding 46 of a delayed operation switch 47 which, when it closes, energizes the winding 48 of switches 15—15 which close and short-circuit the resistance sections 10.

On the sixth step of hoisting, the contact 49 is energized and current flows through a winding 50 of a delayed operation switch 250 which, when it closes, energizes the winding 251 of switches 14—14 which short circuit the remainder of the rotor resistance.

Thus, as will be seen, during hoisting operations, the torque developed by the motor and the speed of operation thereof may be controlled, step by step, to increase or decrease the speed by moving back and forth on the hoist positions 1 to 6 on the drum.

And on the higher torque positions, a time interval is automatically interposed between successive steps to give the motor time to accelerate for well known reasons. Obviously, the master could be thrown over to hoist position 6 at the start and the delayed operation switches 43, 47 and 250 will protect the motor by a gradual acceleration thereof.

When it is desired to lower the load, on lowering point one of the controller, contact 51 is energized and current flows through switch 67 and the winding 52 of the switches 21 and 22 which are the switches 21 and 22 of Fig. 2 and the brake 19 is thereby released. Switch 67 is always normally closed as shown in Fig. 2 except when direct current fails, whereupon it opens, de-energizes winding 52 and opens switches 21 and 22 to set the brake.

Contacts 37 and 38 are also energized which effect short circuiting of the resistance sections 13 and 12 by switches 18 and 17. Contacts 54, 55 and 252 are also energized from which current flows directly to the windings 44, 48 and 251 and operates switches 16—16, 15—15, 14—14, which short circuits the resistance sections 11, 10 and 9. Finally a contact 56 is energized and current flows therefrom through the winding 57 of switches 26 and 27, which as shown in Fig. 2, control the direct current energization of the motor stator.

When the brake 19 is released, as above described, the hoist load drives the rotor and starts to descend, the descent being slow because, as described above, all of the resistance is cut out of the rotor circuit.

To increase the speed of lowering, the controller may be moved successively to lowering points two, three and four. This will successively break connection with the contacts 252, 55 and 54, and will de-energize the windings 251, 48 and 44, and will re-insert the resistance sections 9, 10 and 11 respectively. As above described, the dynamic braking thus effected by the direct current energized stator may be increased or decreased in speed by moving the controller back and forth over the points 1 to 4.

For high speed lowering, the controller is moved to point 5. This breaks the direct current energization of the field by de-energizing contact 56 whereupon switches 26 and 27 open cutting off direct current energization; and it also de-energizes contact 38 introducing all of the resistance, resistance sections 9, 10 and 11 being cut in on point 4. On this point also contacts 33 and 58 are energized. The contact 33 operates the switches 5 and 8 as before, and the contact 58 operates the winding 59 of switches 28 and 29, the operation of these two switches reversing the direction of power application of alternating current to the motor stator and the motor now is driven downwardly by alternating current power with the resistance all in the rotor circuit. On point 5 also, contact 49 is energized and effects operation of the delayed operation switch 250 and after a short interval of time, switches 14—14 close and short circuit all of the resistance at a single step, accelerating the motor to high speed. The motor is now operating as a power-driven induction motor with an overhauling load and quickly comes up to synchronism and the overtravel of the load effects alternating current dynamic braking as above described.

When the switch winding 59 was energized and closed switches 28 and 29, to reverse the motor, it also closed a switch 60 and current immediately flowed from line L—1 through the switch 60 (reproduced separately in the diagram) and thence through the winding 61 of switches 62 and 63 which immediately closed and a third switch 253 which immediately opened. The switch 63 reproduced separately elsewhere in the diagram, immediately energized the winding 48 and closed the switches 15—15.

When now it is desired to reduce the speed of lowering, the operator moves the drum toward the off position. Immediately upon leaving the contacts 58, 49 and 33, the contact 56 is energized and current flows from that contact through the winding 57 to close the dynamic braking direct current switches 26 and 27 and the current also flows from the contact 56 through a switch 64 to be referred to and thence through the now closed switch 62 through the winding 61 holding the switches 62 and 63 closed, the switch 62 thus providing a holding circuit for the winding 61. The opening of switch 253 caused the switches 14—14 to immediately open, but the switch 63 keeps the switches 15—15 closed, 253 and 63 being held operated by the maintained winding 61, so that the resistance sections 9 only are in the motor circuit. Breaking the circuit at contact 33 and contact 58 de-energized the main switches 28, 29 and 5—8 disconnecting the motor stator from the line.

The load is now descending by direct current dynamic braking determined by resistance sections 9 which are of a selected value to cause the braking torque to exceed the load torque and prevent running away of the motor as fully described hereinbefore. This dynamic braking effect will slow the load down to substantially 20% of synchronous speed as described above in connection with Fig. 1, curve 2.

The controller may now be brought to the off position which will break contact at 51, (the circuit having already been broken at 53 when the main switches 6 and 7 opened) and the brake 19 will be applied when the switches 21 and 22 are accordingly opened. The dynamic braking effect, however, is not immediately interrupted when the controller is brought to the off position, being maintained by the following means.

In the "off" position, a contact 32 is energized and current flows therethrough and through the winding 65 of a normally closed switch 64. This switch is a delayed operation switch and after a pre-determined interval of time, which in practice may be two or three seconds, the switch 64 will open. It will be recalled that in the "off" position the dynamic braking circuit is being maintained at the switch 64 (see Figs. 3 and 4) by contact 56 and winding 57 controlling switches 26 and 27, and that the selective resistance is being maintained in the rotor circuit by the switch 63, the winding 61 of which has a holding circuit through contact 62. Therefore, after the said interval of time has elapsed, the switch 64 will open and this will not only de-energize winding 57 and break the dynamic current circuits at 26 and 27 but similarly will de-energize winding 61 and open switch 63 and thereby effect opening of the switches 15—15 to restore all of the resistance sections in the rotor circuit which is the normal condition.

It will be observed that no change of dynamic braking occurs on points 4 to 1 inclusive on going back from point 5, even if the operator leaves the controller on these points; but so long as he keeps the controller on points 4 to 1 after leaving point 5, the alternating current dynamic braking will continue, and when he moves the controller to the off position the brake will set and the time interval will run at the end of which the direct current dynamic braking will be discontinued. It is understood, of course, that the operator may go as quickly as possible from point 5 to the off position; and the dynamic braking will slow down the descent so rapidly that it will be brought to rest by the brake within the time interval and prior to removal of the direct current excitation.

In general the dynamic braking on lowering is of three kinds. On points 1 to 4 the stator is energized with direct current and the rotor resistance is varied at will; on point 5, the stator is energized with alternating current and the dynamic braking is effected after the motor comes up to synchronous speed; and on leaving point 5 to reduce speed, the dynamic braking is effected by the direct current stator and a fixed selected critical resistance in the rotor circuit.

Obviously, after the load has been brought to rest by the friction brake 19 on the off point, the operator may move the controller to points 1, 2, 3 or 4 to again remove the brake and lower the load slowly, and therefore in the normal operation of the controller in lowering a load and accurately positioning or "spotting" it, the operator will move the controller to point 5 and when the load is near the bottom of its descent he will bring the controller to the off position and stop it and then proceeding on points 1 and 2 or 1, 2, 3 and 4 and back again to 1 or by a similar sequence of operations will slowly set the load accurately where desired.

Besides the advantages described above of this type of lowering control, other advantages are had concurrently. The direct current circuit may be utilized to energize the friction brake and therefore it may have a direct current winding which as is well known is fast acting and the magnet operated thereby as is well known will be more durable, alternating current magnets for reasons that are well known being rapidly deteriorating. Furthermore because of the relatively low voltage of the direct current, there will be low inductance in the brake winding which renders it quick setting and quick releasing. As described above, the brake 19 is set whenever the controller is in the off position and on going to the successive hoisting or lowering points and back again to off, the brake if energized with direct current of relatively low voltage, as stated, will be very quick acting and a fine degree of "inching" may be had on both lowering or hoisting.

By having a very high speed lowering point such as point 5, very fast descent over the major portion of the lowering may be had with a consequent saving in time.

The said time interval, referred to as two or three seconds in the foregoing description performed by the switch 65—64 is rendered adjustable by employing a time delayed switch having a time adjustment and such means being so well known in the art, a further description is deemed unnecessary. In the diagrammatic form illustrated a dash-pot escapement 254 may be adjusted by a screw 255.

While it is customary in this art to employ relays, auxiliary contacts on the main switches etc., to interlock the various switches to insure the predetermined sequential operation thereof, these have not been shown in the drawings nor described to avoid further complications and it is believed that engineers skilled in this art will know how to apply such protection.

However, I have illustrated a low voltage switch to afford protection upon failure of the direct current voltage which is relied upon for dynamic braking. This switch has a winding 66 Fig. 2 across the direct current mains 23 and 24 and controls switches 67 and 68 which are normally closed whenever the direct current voltage is present. The switch 67 as shown in Fig. 3 is in the line of the winding 52 controlling the brake 19 and the switch 68 is in the circuit of the winding 59 controlling the reversing circuits 28 and 29. Thus upon failure of voltage these switches will open and the brake will set and the reverse switches cannot be closed to drive the load downwardly.

*Second form*

The second referred to embodiment of my invention will now be described. In view of the more complete description of the first form, it is believed that a brief description of this and the third form to be described will suffice.

Figure 5:
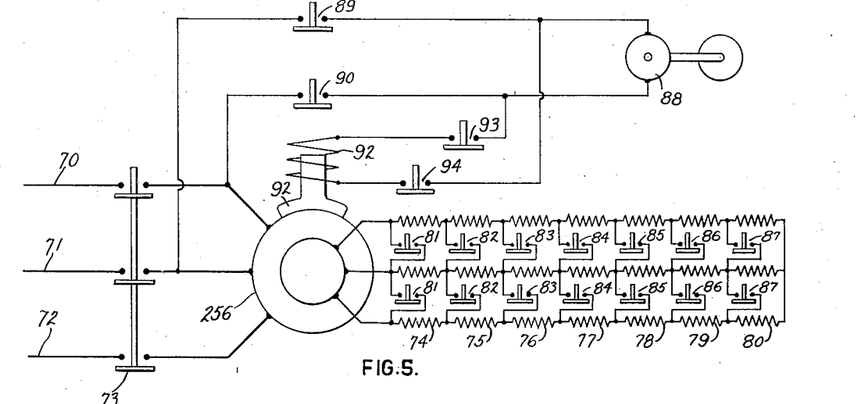
Figs. 5, 6 and 7 are views similar respectively to Figs. 2, 3 and 4 but illustrating a second embodiment of my invention.

In the power circuit diagram Fig. 5, the motor 256 has its stator supplied with alternating current from power mains 70, 71 and 72 under the control of a line switch 73. Resistances 74 to 80 inclusive are provided in the rotor circuit making eight steps of resistance in all, the resistance being under the control of seven switches 81—81 to 87—87 inclusive. The stator of the motor 256 may be supplied with direct current for dynamic braking purposes from a motor generator 38 to the mains 70 and 71 through switches 89 and 90; and the brake winding 91 of the brake 92 may be energized from the motor generator through switches 93 and 94.

In the operation of this form, for hoisting, alternating current is applied to the stator and the resistances 74 to 80 inclusive are first put all in the rotor circuit and are cut out successively by delayed operation switches to accelerate the hoist.

Upon lowering, the line switch 73 is opened, direct current is applied to the stator, the resistances are first all cut out of the rotor circuit to give the maximum braking torque and then one after the other may be cut into the circuit to increase the braked lowering speed and these steps of resistance are changed without time delay; to decrease the lowering speed, the resistances are again cut out in sequence but by delayed operation means which prevents cutting the resistance out so rapidly, as to cause the motor to run away, as above described.

Figure 6:
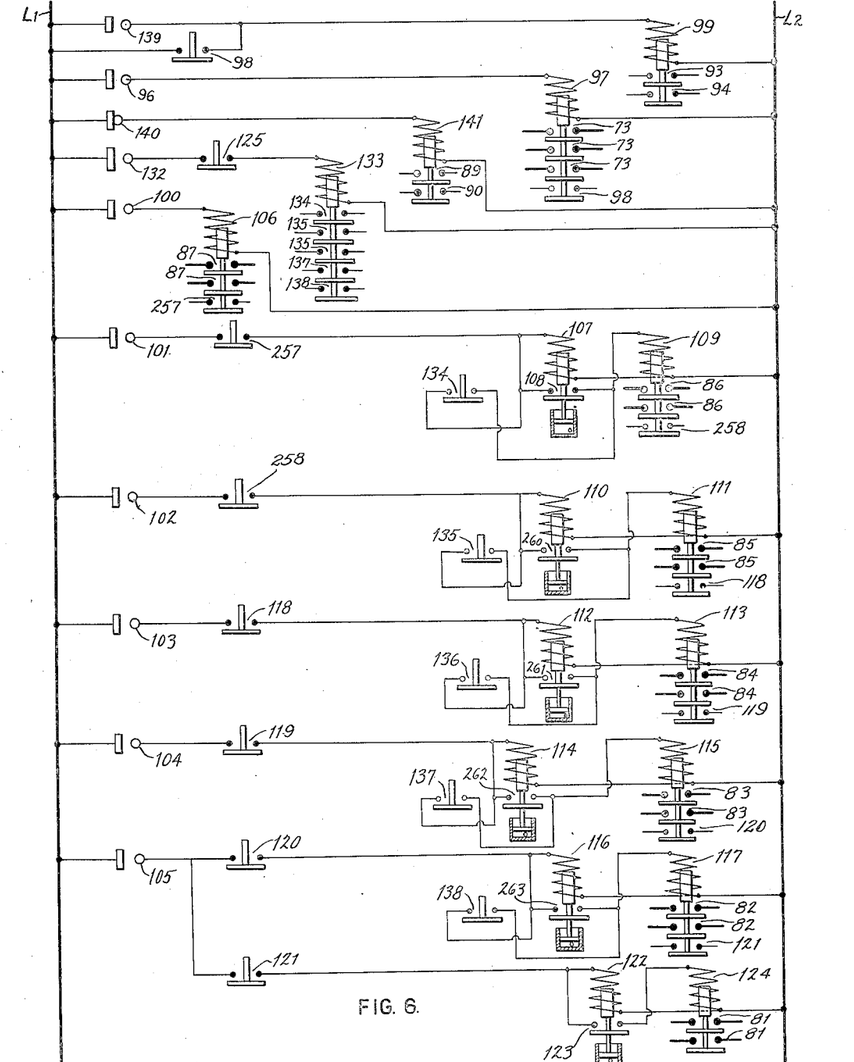
Figure 7:
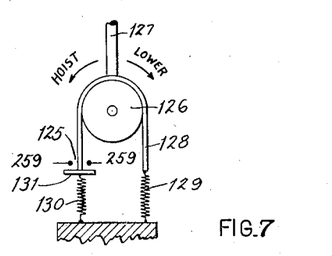

These operations are performed by means of the control circuits illustrated in Fig. 6 and the master drum controller illustrated in Fig. 7.

When the controller Fig. 7 is moved in the hoist direction, contact is first made at 96 and the line switch winding 97 is energized closing the switches 73 and an auxiliary switch 98. Current is thus supplied to the motor, and through the switch 98 to energize the winding 99 which closes the switches 93 and 94 to release the brake.

The motor thus starts to hoist and as the controller is moved to energize contacts 100 to 105 inclusive, the resistance is successively cut out. Current from contact 100 energizes the winding 106 closing switches 87—87 and also closing an auxiliary switch 257.

Switch 257 when contact 101 is energized energizes the winding 107 of a delayed operation switch 108 conventionally illustrated as a dashpot switch and after a predetermined time interval, the switch 108 closes and then current flows to the winding 109 of the switches 86—86. The winding 109 also closes an auxiliary switch 258.

In like manner when the contacts 102 to 105 on the drum are energized by further rotating it in the hoist direction, the windings 110, 112, 114, 116 are energized through the auxiliary contacts, 258, 118, 119 and 120 to operate time delay switches 260 to 263 respectively, to thereby effect energization of the windings 111, 113, 115 and 117 to cause them to close the auxiliary switches 118, 119, 120 and the resistance switches respectively 85—85, 84—84, 83—83, and 82—82 to accelerate the motor. When the switches 82—82 close, an auxiliary switch 121 closes the circuit from the contact 105 to winding 122 of the last delayed operation switch 123 which when it closes energizes the winding 124 of the last resistance switch 81—81, the last two resistance switches thus being under the control of a single contact 105, but the last switch being independently delayed. Thus on hoisting, the motor is accelerated by delayed operation switches.

To lower the load, the master controller Fig. 7 is moved to or toward the lowering position. Movement of the master toward the lowering position at any time operates an auxiliary switch 125 on the master, and movement of the master at any time in the hoist direction opens this switch. This switch 125 can be operated by any suitable mechanism that illustrated in Fig. 7 comprising a drum 126 on the master shaft 127, and a friction strap 128 looped around the drum 126 secured at opposite ends by springs 129 and 130. A movable switch member 131 is secured to the strap adjacent the spring which will yield upon rotary movement of the drum 126 in the lowering direction namely the spring 130, and is engageable with contacts 259—259 of the switch 125 upon rotation of the drum in the lowering direction; and is disengageable therefrom upon rotation of the drum in the hoist direction, upon yielding of the other spring 129.

Therefore upon initiating lowering movement of the drum, when the switch 125 thus closes and when the contact 132 on the master drum is engaged, current may flow from the contact 132 through the switch 125 and through the winding 133 of five switches 134 to 138 inclusive (reproduced elsewhere in Fig. 6) and each arranged to bridge one of the delayed operation switches 108, 260, 261, 262, 263 above described. The closing of these switches 134 to 138 occurs on the first lowering point of the master. On that point also, a contact 139 is energized which effects operation of the brake switches 93 and 94 to release the brake; and the contact 140 is also energized to operate the dynamic braking current switches 89 and 90 by the winding 141.

The brake now being released and the stator of the motor energized with direct current, the load starts downwardly and, simultaneously therewith, all of the contacts 100 to 105 are energized and the resistance switches all close, in a rapid sequence, and since the time delayed switches are now bridged by the switches 134 to 138 inclusive, there is no delay except on the switch 81—81 which is immaterial. The load therefore descends slowly due to the low resistance of the rotor. To increase the speed of the descent, the master controller is moved from point 1 to successive points, successively de-energizing the contacts 105 to 100 and causing the corresponding resistance switches to open, and on the last switch, since all of the resistance is in the rotor circuit, the speed of the descent will be very high.

To break this descent and slow down the load, the controller is moved toward off position to successively energize the contacts 100 to 105 inclusive. Upon the energization of each contact, the corresponding resistance switch closes, the switch 87 closing instantly, but all of the other switches closing after a time delay as in the case of acceleration. It will be noted that on starting the lowering, the delayed operation switches were bridged by the switches 134 to 138 by action of the auxiliary switch 125 on the master; but as above described the switch 125 opens with any movement of the master toward off or toward hoist and therefore upon moving the master to slow down the descending speed, the switch 125 opens which effects opening of all of the said bridging switches, and therefore the resistance switches are restored to the control of the delayed operation switches. By this means therefore, it is impossible to cut the resistance out of the rotor circuit on lowering faster than the rate determined by the delayed operation switches.

On returning toward off from the hoisting points, the switch 125 may close but is without effect because contact 132 of the master switch is closed only in the lowering direction and therefore no circuit is established to switch 125 in the hoisting direction.

To sum up the operation of this second form, an electric controller of the magnetic switch and master drum type will, on hoisting, cut out the rotor resistance step by step under time control and will cut it back in without delay; and upon lowering by direct current stator dynamic braking, the resistance may all be cut in without delay but on being cut out to slow down the braking speed, cannot be cut out faster than a predetermined rate. As described hereinbefore in connection with Fig. 1, this will keep the braking torque always greater than the load torque and will slow down the load without danger of running away, to the speed at which the friction brake will stop and hold it.

Obviously the speed of operation of the successive delayed operation switches can be adjusted by the well known means referred to.

Third form

Figure 8:
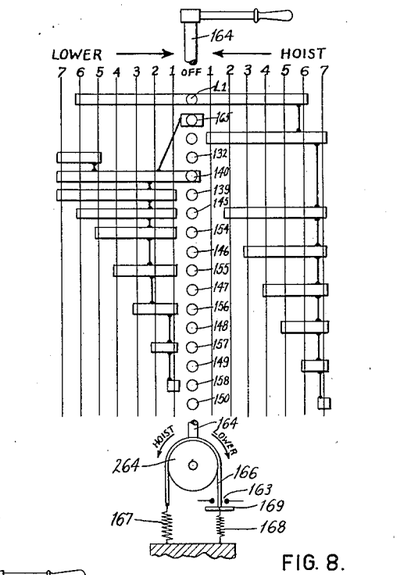
Figs. 9 and 8 are views similar respectively to Figs. 3 and 4 and, taken in connection with Fig. 5, illustrating a third embodiment of my invention.
Figure 9:
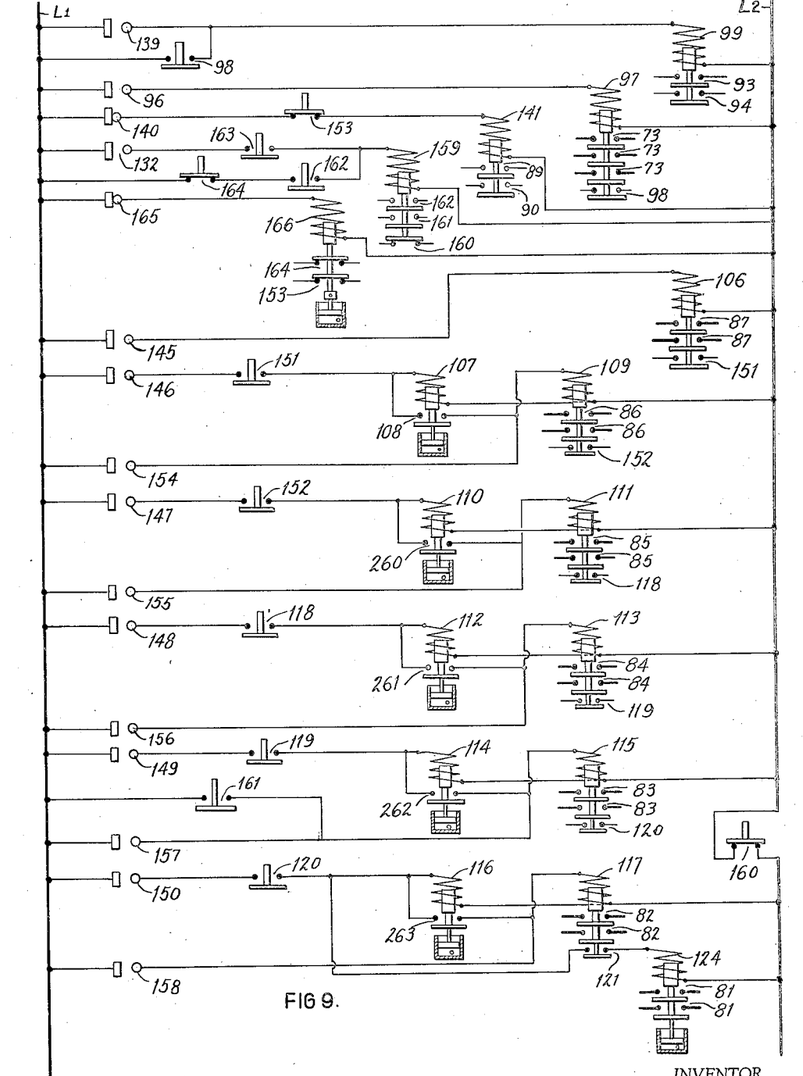

The third referred to embodiment of my invention is illustrated in Figs. 8 and 9 in connection with Fig. 5. The power circuits of the third embodiment now to be described are shown in Fig. 5 being the same as for the second form. In the operation of the third embodiment, with reference to Fig. 5, the hoisting operation is the same as that described for the second form. Upon starting to lower, the line switch 73 is opened and dynamic braking direct current is applied to the stator from the motor generator 88 and the resistances 74 to 80 inclusive are all quickly cut out of the rotor circuit without delay to give maximum lowering torque. The resistances then may be all cut into the rotor circuit by the switches 81 to 87 inclusive likewise without delay, and for the first three sections of resistance 74 to 76 inclusive, the switches 81 to 83 inclusive may be again closed to cut out these resistance sections, at will, and without delay, since these resistance changes will not cause the motor dynamic braking torque to be less than the load torque as explained in connection with Fig. 1, but if switches 84, 85, 86 or 87 be opened to increase the speed, extra-manual means is provided whereby upon returning the master controller to again close the last switches to reduce the speed, the cutting out of the resistance is taken out of the hands of the operator and a selected value at resistance only is inserted in the rotor circuit which is of such value that it will slow down the load without allowing it to run away; this value of resistance being in this case that of the resistance 74 and 75.

This is accomplished by the master drum and control system of Figs. 8 and 9 respectively, and will now be described; parts which are the same as Figs. 5, 6 and 7 having the same reference characters as in those figures.

Upon moving the drum controller to the first hoist position, the contact 96 is energized which operates the line switches 73 to close them; and an auxiliary switch 98 closes the circuit to operate the brake switches 93 and 94 to release the brake. The motor thus starts hoisting with all the resistance in the rotor circuit. As the drum is moved to the successive hoist points, contacts 145 to 150 inclusive are energized. The contact 145 energizes the winding 106 and closes switches 87 to cut out the first section of resistance. These switches close without delay. Contact 146 energizes the winding 107 through a switch 151 also closed by the winding 106. The winding 107 operates the delayed operation switch 108 which when it closes energizes the winding 109 of the switches 86 and closes the control switch 152. Thus the switches 86 operate after a predetermined time interval following the energization of the contact 146. In like manner windings 110, 112, 114, and 116 of corresponding delayed operation switches 260, 261, 262, 263, effect, after a time interval, energization of windings 111, 113, 115 and 117 of the resistance switches 85, 84, 83 and 82, respectively, the windings 111 to 115 also operating control contacts 118, 119 and 120 which control respectively the energization of the delayed operation switch windings 112, 114 and 116; and the energization of the windings 112, 110, 114 and 116 is effected by energization of contacts 147, 148, 149 and 150 on the corresponding hoist steps of the master drum controller.

The winding 117 not only closes switches 82 but closes an auxiliary switch 121 through which the contact 150 also energizes the winding 124 of the last resistance switches 81—81 which are delayed in operation.

Thus on hoisting all of the switches but the first 87—87, are delayed in operation to suitably accelerate the motor.

To lower the load, the master controller is moved in the lowering direction. The contact 140 supplies current through a switch 153 to be described to the winding 141 controlling the direct current stator energizing circuit switches 89 and 90 and closes them. A contact 139 on the drum is energized supplying current to the winding 99 of the switches 93 and 94 which release the brake.

A set of contacts 154 to 158 inclusive are all simultaneously energized, as well as the contact 145. The contact 145 causes the closing of the switches 87; the contact 154 supplies current directly to the winding 109 of the switches 86 causing these switches to close without delay; and in like manner the contacts 155 to 158 inclusive cause the switches 85, 84, 83 and 82 to close without delay, the switch 82 by its auxiliary switch 121 also causing the switches 81 to close but with delay. The resistance therefore is all cut out of the rotor circuit by these switches and lowering starts with the maximum dynamic braking torque.

To increase the speed of lowering, the master is moved in the lowering direction and successively de-energizes the contacts 158, 157, 156, 155, 154 and 145 re-introducing the corresponding resistance sections into the rotor circuit.

When the drum controller is moved to the point 5 thereof at which contact 155 is de-energized, it will be observed that a contact 132 is, at that step, energized and remains energized throughout points 5, 6 and 7 of the controller, whereon the remaining resistance switches are successively de-energized to reinsert the remainder of the resistance. As shown in Fig. 9 the energization of the contact 132 will subsequently be effective to energize the winding 159 controlling a normally closed switch 160 and normally open switches 161 and 162, but these switches will not be operated until the closure of a switch 163 in the line of the contact 132; so that during the movement of the controller to higher and higher lowering speeds, the only result in this respect is to introduce more and more resistance into the rotor circuit.

If, now, however, on either of the points 5, 6 or 7 of the master controller, it be moved toward off position, that is to say to reduce the lowering speed, the said switch 163 will be operated thereby by the means shown diagrammatically in Fig. 8. The drum shaft 164 has thereon a drum 264 over which is bent a friction strap 166 held tight by springs 167 and 168 at its ends and carrying a movable switch member 169 on the side that is tensioned by the spring 168, to open or close a switch 163. Upon rotation of the drum in the lowering direction, the spring 168 will hold the switch 163 open, but on rotation of the drum in the hoist direction or from lowering toward the off position, the spring 168 will be extended and the switch 163 will close. Upon closure of this switch, (contact 132 being energized) the winding 159 will be energized and operate the switches 160 to 162 inclusive with the following effect. The switch 162 makes a holding circuit for the winding 159 through a normally closed switch 164 to be described. The switch 161 closes a direct circuit across the line through the winding 115 which closes the switches 83—83; and the switch 160 upon opening de-energizes the winding of the switches 82 and 81 causing them to open; this places in the rotor circuit only the resistances 74 and 75.

The motor is thus dynamically braked with a predetermined amount of resistance which develops braking torque greater than the load torque even at the high speed provided by the points 5, 6 and 7 on the drum controller (see curves 6, 7 and 8, Fig. 1) and this continues until the controller is brought to the off position. Thereupon a contact 165 is energized supplying current to the winding 166 of normally closed switches 164 and 153 referred to hereinbefore. These switches are delayed operation switches and after a predetermined interval of time such as two or three seconds, these switches open. The switch 164 brakes the circuit to the winding 159 and restores the switches 160 to 162 inclusive; and switch 153 brakes the dynamic braking direct current. These switches will stay operated so long as the controller is in the off position. The brake controlled by the contact 139 is set by de-energization of this contact when the controller is moved to the off position.

As shown in Fig. 1, curve 3 is the braking torque curve when the two sections of resistance 74 and 75 are in the rotor circuit; and this curve is higher than the load torque even at "full load", and at speeds as high as 200% of synchronous speed. Also curve 3 shows that the speed will fall until the load torque and braking torque balance, which is at approximately 40% of synchronous speed. The friction brake can, at this speed, stop and hold the load. If desired the controller may again be moved to one of the first four lowering points and this, by opening the switch 163, restores the lowering to the control of the operator. Therefore he may reduce the speed to curve 2 or curve 1 before setting the brake in the off position.

Thus, in dynamic braking with this arrangement, the resistance may be cut in or out at will on points 1 to 4 of the controller during lowering, but if the controller is moved to either point 5, 6 or 7, then the controller cannot be moved back toward off to cut resistance out of the rotor circuit at will since this might cause the load to run away with the motor; but only a predetermined value of resistance is automatically inserted in the rotor circuit which will bring the motor down to a low speed at which it may be stopped and held by the friction brake.

As will be apparent, the resistance section 9 in the first described form and the resistance sections 74 and 75 of the second form are not chosen to be the said critical resistance merely because they are present for acceleration on hoisting. To the contrary a suitable critical value of resistance is chosen which, because of the speed-torque-resistance characteristics of the motor will give the desired braking effect as shown in Fig. 1, and this resistance is then used for the sake of simplicity as an accelerating resistance.

The said preselected value of resistance will vary for different makes, types and horsepowers of motor.

In the following I have given the value of said resistance in a number of illustrative cases, the resistance in ohms being that to be used in each of the three phases of the secondary circuit of the induction motor.

Motor: 40 H. P. "Reliance" standard type, wound rotor; 440 volt, 3 phase, 60 cycle, 900 R. P. M.; synchronous speed; secondary volts 300; secondary amperes 65.
Preselected resistance: 0.99 ohm.

Motor: 60 H. P. "Reliance" standard type, wound rotor; 440 volt; 3 phase; 60 cycle; 900 R. P. M.; synchronous speed; secondary volts 300; secondary amperes 88.
Preselected resistance: 0.643 ohm Motor: 75 H. P. "General Electric" mill type, wound rotor; 440 volt; 3 phase; 25 cycle; 750 R. P. M.; synchronous speed; secondary volts 220; secondary amperes 169.
Preselected resistance: 1.145 ohms.

Motor: 80 H. P. "General Electric" mill type, wound rotor; 550 volt; 3 phase; 60 cycle; 600 R. P. M.; synchronous speed; secondary volts 219; secondary amperes 171.
Preselected resistance: 0.50 ohm Motor: 150 "Westinghouse" mill type, wound rotor; 550 volt; 3 phase; 60 cycle; 900 R. P. M.; synchronous speed; secondary volts 316; secondary amperes 213.
Preselected resistance: 0.56 ohm.

My invention is not limited to the exact details of construction nor to the exact arrangement of the electric systems herein illustrated and described. Changes and modifications may be made within the spirit of my invention without sacrificing its advantages and within the scope of the appended claims.

I claim:

1. In connection with an induction motor comprising a field element and an armature element one of which is a rotor, and having variable resistance in its armature circuit and provided with both manual and automatic means for varying the resistance, the method of controlling the velocity of movement of a load while overhauling the rotor which includes causing the field to be energized with direct current, causing the armature to react thereon to develop dynamic braking torque in the rotor, manually changing the armature circuit resistance to manually change the rotor speed within a speed range including a predetermined maximum safe speed above which speed a too rapid decrease of the armature resistance would cause the rotor torque to be less than the load torque, manually increasing the armature resistance to increase the rotor speed above said maximum, and, to reduce the speed from said higher speeds, automatically changing the armature circuit resistance to a preselected single value such that at all speeds from said higher speed down to and below said maximum safe speed, the rotor torque will be greater than the load torque.

2. In connection with an induction motor comprising a field element and an armature element one of which is a rotor, and having variable resistance in its armature circuit and provided with both manual and automatic means for varying the resistance, the method of controlling the velocity of movement of a load while overhauling the rotor which includes causing the field to be energized with direct current, causing the armature to react thereon to develop dynamic braking torque in the rotor, manually changing the armature circuit resistance to manually change the rotor speed within a range including a predetermined maximum safe speed above which speed a too rapid decrease of the armature resistance to decrease the rotor speed would cause the rotor torque to be less than the load torque, manually further increasing the armature resistance to increase the rotor speed above said maximum speed, and to reduce the dynamically braked speed from said higher speeds, automatically decreasing the resistance of the armature circuit at a retarded rate to cause the rotor torque to be increased and at all times to be greater than the load torque during said speed reduction from said higher speeds down to and below said maximum safe speed.

3. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable manually controlled means to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, electrically controlled means to control the armature circuit resistance to cause it to effect dynamic braking torque greater than the load torque when the rotor is overhauled at speeds higher than said maximum safe speed, to thereby reduce the speed at which the rotor is overhauled, from said higher speeds down to speeds below said safe speed, and manually actuable means for effecting actuation of said electrically controlled means.

4. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable manually controlled means to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means arranged to energize the field with alternating current to cause the overhauled rotor to come up to motor synchronous speed, and to then be overhauled by the load and driven at dynamically braked speeds greater than synchronous speed, electrically controlled means to interrupt the alternating current energization of the field and to re-establish the direct current energization thereof and to control the resistance in the armature circuit to cause it to have a value at which the braking torque will be greater than the load torque at said greater than synchronous speeds to thereby reduce the speed at which the rotor is overhauled, from said greater-than-synchronous speeds down to speeds below said maximum safe speed, and manually actuable means for effecting actuation of said electrically controlled means.

5. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable manually controlled means to effect the inclusion of a variable amount of resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means to effect the inclusion of resistance in the armature circuit to increase the overhauled braked speed above said maximum safe speed, electrically controlled means to control the resistance in the armature circuit to cause it to have a value at which the braking torque will be greater than the load torque when the rotor is overhauled at speeds higher than said maximum safe speed to thereby reduce the speed at which the rotor is overhauled, from said higher speeds down to speeds below the said maximum safe speed, and manually actuable means for effecting actuation of said electrically controlled means.

6. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable manually controlled means to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually operable means to effect the inclusion of resistance in the armature circuit to further increase the lowering speed above said maximum speed, electrically controlled means to effect the removal of resistance from the armature circuit by successive steps to efect a reduction of the dynamically braked speed to thereby reduce the speed from said high speeds down to speeds below said maximum safe speed, said electrically controlled means comprising means to delay the successive steps of removal to thereby cause the rotor torque to always be greater than the load torque at all speeds down to speeds below the safe speed, and manually actuable means for effecting actuation of said electrically controlled means.

7. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor ovehauled speed within a speed range which includes a maximum safe speed above which a too rapid decrease of armature resistance would cause the rotor torque to become less than the load torque, and to reduce the overhauled speed from speeds higher than the said maximum safe speed to speeds below it, extra-manually controlling the armature circuit resistance to cause it at all speeds from said higher speeds down to and below said maximum safe speed, to effect a dynamic braking torque greater than the load torque.

8. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor overhauled speed within a speed range which includes a maximum safe speed above which a too rapid decrease of armature resistance would cause the rotor torque to become less than the load torque, and to attain speeds higher than the maximum safe speed, changing the energization of the field element from direct current to alternating current in the direction to drive the rotor by power, and braking the rotor at overhauled speeds greater than synchronous speed by the reaction of the armature on the alternating field, and to reduce the speed from said higher speeds to speeds below the said maximum safe speed, again energizing the field element with direct current and extra-manually controlling the armature circuit resistance to cause it, at all speeds from said higher speeds down to and below said maximum safe speed, to effect a dynamic braking torque greater than the load torque.

9. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor overhauled speed within a speed range which includes a maximum safe speed above which a too rapid decrease of armature resistance would cause the rotor torque to become less than the load torque, and to attain speeds higher than the maximum safe speed, changing the energization of the field element from direct current to alternating current in the direction to drive the rotor by power, and braking the rotor at overhauled speeds greater than synchronous speed by the reaction of the armature on the alternating field, and to reduce the speed from said higher speeds to speeds below the said maximum safe speed, again energizing the field element with direct current and extra-manually controlling the amount of resistance of the armature circuit to maintain it at a selected fixed value such that at all speeds from said higher speeds down to and below said maximum safe speed the dynamic braking torque will be greater than the load torque.

10. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor overhauled speed within a speed range which includes a maximum safe speed above which a too rapid decrease of armature resistance would cause the rotor torque to become less than the load torque, and to increase the overhauled speed to speeds higher than said maximum safe speed, manually increasing the resistance in the armature circuit, and to reduce the overhauled speed from said higher speeds to speeds below the said maximum safe speed, extra-manually controlling the resistance of the armature circuit to maintain it at such value that at all speeds from said higher speeds down to and below said maximum safe speed the dynamic braking torque will be greater than the load torque.

11. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor overhauled speed within a speed range which includes a maximum safe speed above which a too rapid decrease of armature resistance would cause the rotor torque to become less than the load torque, and to increase the overhauled speed to speeds higher than said maximum safe speed, manually increasing the resistance in the armature circuit, and to reduce the overhauled speed from said higher speeds to speeds below the maximum safe speed, extra-manually controlling the resistance of the armature circuit to maintain it at a pre-selected fixed value such that at all speeds from said higher speeds down to and below said maximum safe speed the dynamic braking torque will be greater than the load torque.

12. In connection with an induction motor having a direct current energized field element and an armature element one of which is a rotor, the method of controlling the velocity of the rotor while being overhauled by a load, which includes manually changing the resistance of the armature circuit to vary the dynamic braking reaction of the armature on the field to vary the rotor overhauled speed within a speed range which includes a maximum safe speed above which a too rapid decrease of armature resistance would cause the rotor torque to become less than the load torque, and to increase the overhauled speed to speeds higher than said maximum safe speed, manually increasing the resistance in the armature circuit, and to reduce the overhauled speed from said higher speeds to speeds below the said maximum safe speed, extra-manually decreasing the resistance of the armature circuit by successive time delayed steps to prevent the resistance from being decreased at too rapid a rate and so that from said higher speeds down to speeds below said maximum safe speed, the dynamic brake torque will be greater than the load torque.

13. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable, manually controlled means including manually operable contacts and conductors controlled thereby to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, electrically controlled means including electrically operable contacts and conductors controlled thereby to control the armature circuit resistance to cause it to effect a dynamic braking torque greater than the load torque when the rotor is overhauled at speeds higher than said maximum safe speed, to thereby reduce the speed at which the rotor is overhauled, from said higher speeds down to speeds below said safe speed, and manually actuable means including other manually operable contacts and conductors controlled thereby for effecting actuation of said electrically controlled means.

14. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable, manually controlled means including manuable operable contacts and conductors controlled thereby to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means including manually operable contacts and conductors controlled thereby arranged to interrupt the direct current energization of the field and to energize the field with alternating current to cause the overhauled rotor to come up to motor synchronous speed, and to then be overhauled by the load and driven at dynamically braked speeds greater than synchronous speed, electrically controlled means including electrically operable contacts and conductors controlled thereby to interrupt the alternating current energization of the field and to re-establish the direct current energization thereof and to control the armature circuit resistance to cause it to have a value at which the braking torque will be greater than the load torque at said greater than synchronous speeds to thereby reduce the speed at which the rotor is overhauled, from said greater-than-synchronous speeds down to speeds below said maximum safe speed, and manually actuable means including other manually operable contacts and conductors controlled thereby for effecting actuation of said electrically controlled means.

15. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable, manually controlled means including manually operable contacts and conductors controlled thereby to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means including other manually operable contacts and conductors controlled thereby to effect the inclusion of resistance in the armature circuit to increase the overhauled braked speed above said maximum safe speed, electrically controlled means including electrically operable contacts and conductors controlled thereby to control the resistance in the armature circuit to cause it to have a value at which the braking torque will be greater than the load torque when the rotor is overhauled at speeds higher than said maximum safe speed to thereby reduce the speed at which the rotor is overhauled, from said higher speeds down to speeds below the said maximum safe speed, and manually actuable means including other manually operable contacts and conductors controlled thereby for effecting actuation of said electrically controlled means.

16. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable, manually controlled means including manually operable contacts and conductors controlled thereby to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means including other manually operable contacts and conductors controlled thereby to effect the inclusion of resistance in the armature circuit, to further increase the lowering speed above said maximum safe speed, electrically controlled means including electrically operable contacts and conductors controlled thereby to effect the removal of resistance from the armature circuit by successive steps to effect a reduction of the dynamically braked speed to thereby reduce the speed from said high speeds down to speeds below said maximum safe speed, said electrically controlled means comprising means to delay the successive steps of removal to thereby cause the rotor torque to always be greater than the load torque at all speeds down to speeds below the safe speed, and manually actuable means including other manually operable contacts and conductors controlled thereby for effecting actuation of said electrically controlled means.

17. In a dynamic braking control for induction motors of the type comprising a field and an armature, one of which is a rotor subjected to an overhauling load torque, a source of direct current, conductors arranged to energize the motor field with direct current from the source to cause the load overhauled rotor to be dynamically braked, a resistance, manually actuable, manually controlled means including manually operable contacts and conductors controlled thereby to effect the inclusion of a variable amount of the resistance in the armature circuit to reduce or increase the braked speed at which the rotor is overhauled, and within a predetermined speed range including a maximum safe speed above which a too rapid manually effected removal of resistance from the armature circuit would cause the rotor braking torque to be less than the load torque, manually actuable means including manually operable contacts and conductors controlled thereby arranged to energize the field with alternating current to cause the overhauled rotor to come up to motor synchronous speed, and to then be overhauled by the load and driven at dynamically braked speeds greater than synchronous speed, electrically controlled means including electrically operable contacts and conductors controlled thereby to interrupt the alternating-current energization of the field and to re-establish the direct current energization thereof and to control the resistance in the armature circuit to cause it to have a selected fixed value at which the braking torque will be greater than the load torque at said greater than synchronous speeds to thereby reduce the speed at which the rotor is overhauled, from said greater-than-synchronous speeds down to speeds below said maximum safe speed, and manually actuable means including other manually operable contacts and conductors controlled thereby for effecting actuation of said electrically controlled means.

18. In connection with an induction motor comprising a field element and an armature element one of which is a rotor, and having variable resistance in its armature circuit and provided with both manual and automatic means for varying the resistance, the method of controlling the velocity of movement of a load while overhauling the rotor which includes causing the field to be energized with direct current, causing the armature to react thereon to develop dynamic braking torque in the rotor, manually changing the armature circuit resistance to manually change the rotor speed within a speed range including a predetermined maximum safe speed above which speed a too rapid decrease of the armature resistance would cause the rotor torque to be less than the load torque, and, to cause the rotor speed to be higher than said maximum safe speed, manually effecting a change of field energization from direct current to alternating current to cause the rotor to be driven in the overhauling direction up to synchronous speed and above synchronous speed to be dynamically braked by reaction of the armature on the alternating current field, and, to reduce the speed from said higher speeds, automatically changing the field energization back to direct current and causing the armature circuit to have a pre-selected single value of resistance such that, at all speeds from said higher speeds down to and below said maximum safe speed, the rotor torque will be greater than the load torque.

LESTER H. COLBERT.